(12) United States Patent
Matsuoka et al.

(10) Patent No.: US 9,915,930 B2
(45) Date of Patent: Mar. 13, 2018

(54) SMART-HOME CONTROL PLATFORM HAVING MORPHABLE LOCUS OF MACHINE INTELLIGENCE BASED ON CHARACTERISTICS OF PARTICIPATING SMART-HOME DEVICES

(71) Applicant: Google Inc., Mountain View, CA (US)

(72) Inventors: Yoky Matsuoka, Los Altos Hills, CA (US); Mark Rajan Malhotra, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 14/636,936

(22) Filed: Mar. 3, 2015

(65) Prior Publication Data

US 2016/0259307 A1 Sep. 8, 2016

(51) Int. Cl.
*G05B 15/02* (2006.01)
*H04L 12/28* (2006.01)

(52) U.S. Cl.
CPC .......... *G05B 15/02* (2013.01); *H04L 12/2807* (2013.01); *G05B 2219/2642* (2013.01)

(58) Field of Classification Search
CPC ............ G05B 15/02; G05B 2219/2642; H04L 12/2807
See application file for complete search history.

(56) References Cited

U.S. PATENT DOCUMENTS

| | | | | |
|---|---|---|---|---|
| 4,962,473 A * | 10/1990 | Crain | ..................... | G08B 25/14 340/539.2 |
| 5,086,385 A * | 2/1992 | Launey | ............... | G06F 3/04847 340/6.11 |
| 5,722,076 A * | 2/1998 | Sakabe | ................. | H04M 1/733 370/338 |
| 6,028,858 A * | 2/2000 | Rivers | ................. | H04L 12/2854 370/352 |
| 8,478,447 B2 | 7/2013 | Fadell et al. | | |
| 9,208,676 B2 * | 12/2015 | Fadell | .................. | G05B 19/042 |
| 2009/0232008 A1 * | 9/2009 | Wurst | ..................... | H04L 41/26 370/245 |
| 2012/0016974 A1 * | 1/2012 | Bartholomay | ...... | H04L 41/5041 709/221 |

(Continued)

*Primary Examiner* — Ramesh Patel
(74) *Attorney, Agent, or Firm* — Morris & Kamlay LLP

(57) ABSTRACT

A system is provided, including a plurality of inter-connected premises management devices, each premises management device including a storage device, a memory that stores computer executable components, and a processor that executes the following computer executable components stored in the memory: a primary function component to control a primary function of the premises management device related to managing a premises, a communication component to locate and to communicate with other compatible premises management devices, and a computational component to process system related tasks. Each premises management device is configured to function as part of a unit comprising one or more devices that collectively form a primary system processor when the present primary system processor assigns the respective premises management device to the unit. The primary system processor processes system level tasks.

24 Claims, 4 Drawing Sheets

(56) References Cited

U.S. PATENT DOCUMENTS

| | | | |
|---|---|---|---|
| 2012/0017012 A1* | 1/2012 | Bartholomay | H04L 41/5041 |
| | | | 710/51 |
| 2014/0266669 A1* | 9/2014 | Fadell | G05B 19/042 |
| | | | 340/501 |
| 2016/0189533 A1* | 6/2016 | Modi | G08B 31/00 |
| | | | 340/507 |

* cited by examiner

SMART-HOME CONTROL PLATFORM HAVING MORPHABLE LOCUS OF MACHINE INTELLIGENCE BASED ON CHARACTERISTICS OF PARTICIPATING SMART-HOME DEVICES

BACKGROUND

Some homes today are equipped with smart home networks to provide automated control of devices, appliances and systems, such as heating, ventilation, and air conditioning ("HVAC") system, lighting systems, home theater, entertainment systems, as well as security systems. Smart home networks include central hubs or control panels that a person may use to input settings, preferences, and scheduling information that the smart home network uses to provide automated control of the various devices, appliances, and systems in the home. For example, the person may input a schedule indicating when the person is away from the home, and the smart home network will use this information along with information obtained from various devices in the home to detect unauthorized entry when the user is away.

BRIEF SUMMARY

According to an embodiment of the disclosed subject matter, a system is provided, including a plurality of inter-connected premises management devices, each premises management device including a storage device, a memory that stores computer executable components, and a processor that executes the following computer executable components stored in the memory: a primary function component to control a primary function of the premises management device related to managing a premises, a communication component to locate and to communicate with other compatible premises management devices, and a computational component to process system related tasks. Each premises management device is configured to function as part of a unit comprising one or more devices that collectively form a primary system processor when the present primary system processor assigns the respective premises management device to the unit. The primary system processor processes system level tasks.

According to an embodiment of the disclosed subject matter, a method is provided for operating a premises management system including a plurality of inter-connected premises management devices, each having a primary function related to management of a premises and each including a storage device, a memory that stores computer executable components, and a processor that executes computer executable components stored in the memory, the method including assigning one or more of the plurality of premises management devices to a unit that functions as a primary system processor to process system-level tasks for the premises management system, establishing a connection between the plurality of premises management devices and a first premises management device which, prior to the connection, was not one of the plurality of premises management devices, and assigning the first premises management device to the unit that functions as the primary system processor when the primary system processor determines that the assignment advances an operational objective of the primary system processor.

According to an embodiment of the disclosed subject matter, means for assigning one or more of a plurality of premises management devices to a unit that functions as a primary system processor to process system-level tasks for the premises management system, establishing a connection between the plurality of premises management devices and a first premises management device which, prior to the connection, was not one of the plurality of premises management devices, and assigning the first premises management device to the unit that functions as the primary system processor when the primary system processor determines that the assignment advances an operational objective of the primary system processor are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
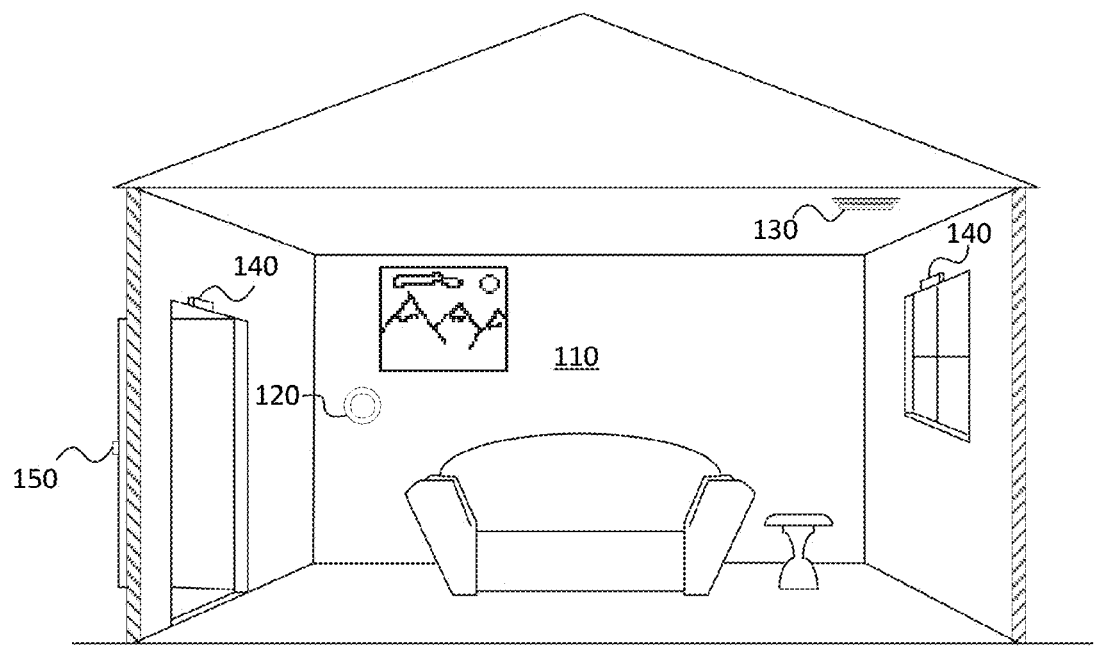
FIG. 1 shows an example premises management system according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosed subject matter may be practiced without these specific details, or with other methods, components, materials, etc. In other instances, well-known structures and devices are shown in block diagram form to facilitate describing the subject disclosure.

An implementation of the disclosed subject matter relates to a system such as a smart home environment that includes several components having sensors and processors. It can be undesirable or impossible to have a single processor control such a system. For example, any single processor may have insufficient computing power to control the home environment system, or may have insufficient electrical power to maintain necessary communications with other components. Examples of system control functions can include synthesizing, analyzing and reporting data from different sensor and processor components, providing user interfaces, receiving user inputs, taking action based on data from sensor and processor components and from user inputs, and so on.

Consequently, implementations of the disclosed subject matter can distribute the tasks of controlling the home among the processors found in at least some of the components of the system. Because components can be added or removed from the system and because conditions in the home environment are subject to change, the implementation can dynamically distribute control tasks among processors. The decision about how to allocate a system control task can be made on the basis of how much electrical power is available to a component, whether the component is hardwired to a power system or operates on battery power, the type and amount of computational capability of the component, the component's access to a network and its capacity bandwidth, and so on.

The system's components can be electrical and/or mechanical, including intelligent, sensing, network-connected devices that communicate with each other and/or may communicate with a central server or a cloud-computing system to provide any of a variety of environment and/or security management objectives in a home, office, building or the like. Such objectives, which may include, for example, managing room temperature, managing door locks, managing building alarms, etc., will collectively be referred to as "premises management." A premises management system as disclosed herein may further include subsystems that communicate with each other to handle different aspects of premises management, such as a security system component that controls alarms and security of the premises and a smart home component that controls environmental aspects such as light and temperature of the premises.

The individual hardware components of the system used to monitor and affect the premises in order to carry out premises management will hereinafter be referred to as "premises management devices." The premises management devices described herein can include multiple physical hardware and firmware configurations, along with circuitry hardware (e.g., processors, memory, etc.), firmware, and software programming that are capable of carrying out the currently described methods and functions of a premises management system. Furthermore, the premises management devices may be configured to implement a "brain" functionality, as described below, which may be distributed and dynamically redistributed among one or more premises management devices within the system.

FIG. 1 shows an example premises management system 100 within a premises 110. The system 100 may include multiple types of premises management devices, such as one or more intelligent, multi-sensing, network-connected thermostats 120, one or more intelligent, multi-sensing, network-connected hazard detection units 130, one or more intelligent, multi-sensing, network-connected entry detection units 140, and one or more network-connected door handles 150.

The system 100 may be configured to operate as a learning, evolving ecosystem of interconnected devices. New premises management devices may be added and existing premises management devices may be replaced or removed without causing a failure of the system 100. Such removal may include intentional or unintentional removal of components from the system 100 by the user, as well as removal by malfunction (e.g., loss of power, destruction by intruder, etc.). Therefore the functionality and objectives of the system 100 may change as the constitution and configuration of the system 100 changes.

Generally, the premises management devices in the system 100 may be categorized as including passive devices (i.e., devices which have a primary function to sense, detect or control at a basic level with simple logic and a limited number of states, such as door handle 150) and smart devices (i.e., devices which have computational ability that exceeds that of the passive devices, are capable of executing relatively complex logic, and are capable of controlling other devices, such as thermostat 120 controlling the HVAC system). Each of these devices may vary in capabilities, yet all function together to manage the premises in accordance with a user's instructions and the system's objectives.

In order to avoid contention and race conditions among the interconnected devices, certain decisions, such as those which affect the premises management system 100 at a system level or that involve data from multiple sources, may be centralized. A central "brain" component may coordinate decision making across the system 100 or across a designated portion thereof. The brain component may be viewed as an entity at which, for example, data from different detectors converge, user interaction is interpreted, sensor data is received and decisions are made concerning the state of the system 100. Hereinafter, the system 100 brain component will be referred to as the "primary system processor."

The primary system processor may control and/or receive inputs from both smart and passive devices. In the embodiments disclosed herein, such devices may include one or more sensors that provide the primary system processor with data about the premises 110. In general, a "sensor" may refer to any device that can obtain information about its environment. A brief description of sensors with examples in the context of the system 100 follows. These examples are not intended to be limiting but are merely provided as illustrative subjects to help facilitate describing the invention. The system 100 is not limited to the types of sensors described below, but may employ any type of sensor. Sensors are known in the art and their deployment as described herein will be readily understood by one of ordinary skill on the art.

Sensors may be described by the type of information they collect. For example, sensor types as disclosed herein may include motion, smoke, carbon monoxide, proximity, temperature, time, physical orientation, acceleration, location, entry, presence, pressure, light, and sound, sensors and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof.

A sensor also may be described in terms of a function or functions the sensor performs within the system 100. For example, a sensor may be described as a security sensor when it is used to determine security events such as unauthorized entry.

A sensor may operate for different functions at different times. For example, system 100 may use data from a motion sensor to determine how to control lighting in the premises 100 when an authorized user is present and use the data to alert to unauthorized or unexpected movement when no authorized user is present. In another example, the system 100 may use the motion sensor data differently when an alarm system is in an "stay" state versus an "away" state.

In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of system 100, or as otherwise directed by the primary system processor.

A premises management device as described herein may include multiple sensors or sub-sensors, such as a position sensor that includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is beneficial for understanding of the embodiments disclosed herein.

Figure 2:
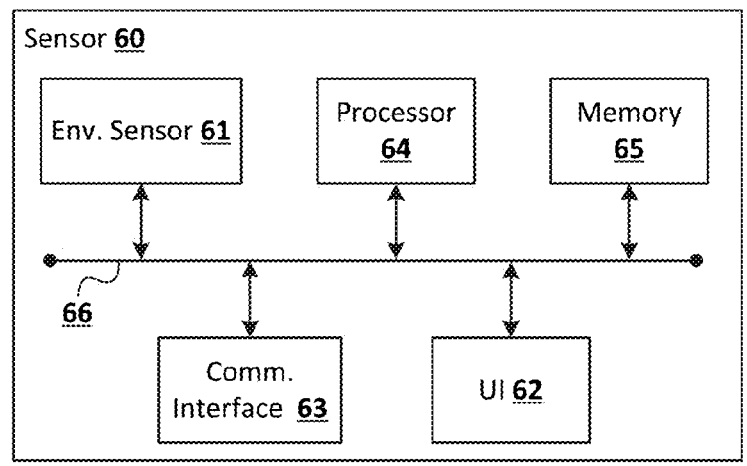
FIG. 2 shows an example premises management device according to an embodiment of the disclosed subject matter.

FIG. 2 shows an example premises management device 60 including a sensor as disclosed herein. The premises management device 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass or any other suitable environmental sensor, that obtains or provides a corresponding type of information about the environment in which the premises management device 60 is located. A processor 64 may receive and analyze data obtained by the sensor 61, control operation of other components of the premises management device 60 and/or external devices, and process communication between the premises management device 60 and other devices. The processor 64 may execute instructions and/or computer executable components stored on a computer-readable memory 65. Such computer executable components could include, for example, a primary function component to control a primary function of the premises management device 60 related to managing a premises, a communication component to locate and communicate with other compatible premises management devices, and a computational component to process system related tasks.

The memory 65 or another memory in the premises management device 60 may also store environmental data obtained by the sensor 61. A communication interface 63, such as a WiFi or other wireless interface, Ethernet or other local network interface, Bluetooth® or other radio interface, or the like may allow for communication by the premises management device 60 with other devices.

A user interface (UI) 62 may provide information and/or receive input from a user of system 100. The UI 62 may include, for example, a speaker to output an audible alarm when an event is detected by the premises management device 60. Alternatively, or in addition, the UI 62 may include a light to be activated when an event is detected by the premises management device 60. The user interface may be relatively minimal, such as a liquid crystal display (LCD), light-emitting diode (LED) display, or limited-output display, or it may be a full-featured interface such as a touchscreen, keypad, or selection wheel with a click-button mechanism to enter input.

Components within the premises management device 60 may transmit and receive information to and from one another via an internal bus 66 or other mechanism, as will be readily understood by one of skill in the art. One or more components may be implemented in a single physical arrangement, such as where multiple components are implemented on a single integrated circuit. Premises management devices 60 as disclosed herein may include other components, and/or may not include all of the illustrative components shown.

As previously mentioned, sensor 61 on premises management device 60 within system 100 obtains data about the premises. Through the bus 66 and/or communication interface 63 this data is transmitted to the primary system processor. In addition, two or more sensors on one or more premises management devices may transmit data that can be coordinated by the primary system processor to determine a system response and/or infer a state of the environment. For example, an ambient light sensor in a room may sense that the room is dark (e.g., less than 60 lux). A microphone in the room may detect a sound above a set threshold, such as 60 dB. As a system response the primary system processor of system 100 may activate one or more lights in the room based on the data transmitted by both sensors.

Coordination of data received from different types of devices for the objective of controlling the system is an advantage that a primary system processor provides. Such coordination is effective in improving the impact of passive devices. If the system 100 only received data from a passive ambient light sensor, the system 100 may not have sufficient basis to accurately alter the state of the lighting in the room. Similarly, if the system 100 only received data from a passive microphone, the system 100 may lack sufficient data to accurately determine whether activating the lights in the room is necessary. For example, during the day the room may already be bright or during the night the lights may already be on.

However, in addition to communicating with the primary system processor, certain premises management devices 60 in system 100 may be configured to communicate with one another. Data generated by multiple sensors simultaneously or nearly simultaneously may be used by premises management devices 60 which are smart devices to determine a state of an environment and, based on the determined state, generate a response, e.g., transmit more useful data to the primary system processor or more accurately execute the smart device's primary function.

Premises management devices 60 may operate and transmit data on state basis. For example, a premises management system 100 may employ a passive premises management device 60 including a sensor 61 implemented as magnetometer. As mentioned above, for clarity's sake this passive device may be referred to simply as a magnetometer. The magnetometer may be affixed to a door jamb and a magnet affixed to the door. When the door is closed, the magnetometer may detect the magnetic field emanating from the magnet. Upon detection of the magnetic field the magnetometer may store data indicating the device is in a first state. If the door is opened, the increased distance may cause the magnetic field near the magnetometer to be too weak to be detected by the magnetometer. Upon the loss of detection of the magnetic field the magnetometer may store data indicating the device is in a second state. This change of state may be referred to as an event. The primary system processor of the premises management system 100 may access this data or receive transmissions of the data and interpret the state as indicating the door being presently ajar and such an event as indicating the door being opened.

It should be noted that although passive devices are limited in function, within system 100 passive devices may be configured to operate together for the objective of obtaining better data. For example, a separate sensor or a sensor integrated into the magnetometer may be incorporated to obtain additional data regarding the status of the door. For example, an accelerometer and/or a compass may be affixed to the door and indicate the status of the door and/or augment the data provided by the magnetometer.

The management and coordination of such data from all premises management devices within system 100 is the function of the primary system processor. A primary system processor as used herein is defined as a computing device/devices configured to receive data input or data from sensory inputs and make at least one premises management decision based on such data. Although the primary system processor is the central processing center of the premises management system 100, it is not necessarily confined to a single component. In system 100, the primary system processor's function may be distributed across one or more smart devices of the system 100, for example, utilizing one or more processors 64, memory 65, and communication interfaces 63 of one or more premises management devices 60 (see FIG. 2). Furthermore, the designation of which of the one or more devices within system 100 implement the primary system processor functionality may be self-determined dynamically and automatically, for example, by the primary system processor itself. The system 100 may therefore be understood to be an organically evolving ecosystem with a primary system processor which adjusts its own constitution to make improving and efficient use of current system resources in accordance with system objectives.

Figure 4:
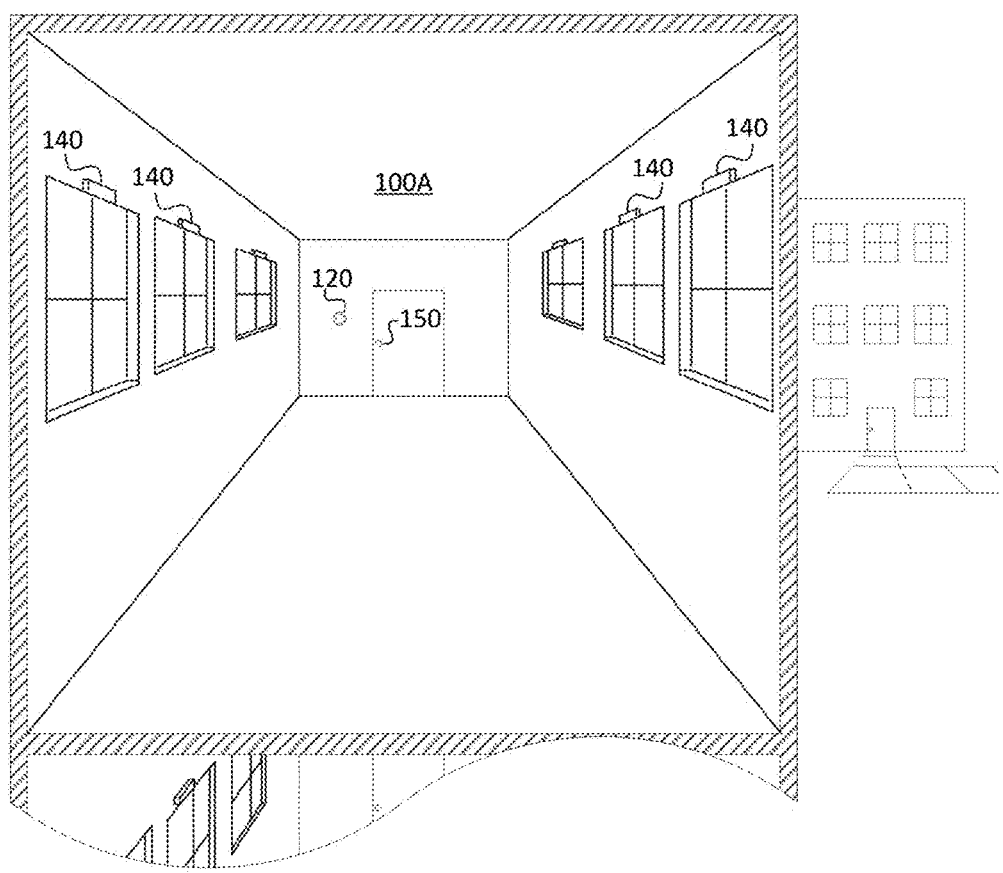
FIG. 4 another example premises management system according to an embodiment of the disclosed subject matter.

The system 100 feature of dynamic and automatic adjustment provides the advantage of a system that can contract or expand functionality efficiently. Referring to FIG. 4, a portion of an example premises management system 100A is shown. Premises management system 100A initially includes twenty thermostats 120 and fifty entry detection devices 140 that monitor fifty different windows on various floors of an office building. Ideally, the primary system processor is capable of processing data from at least seventy different devices, process their events, and store related system states. However, as the number of premises management devices 60 in the system 100 grows, so would the hardware requirements of the primary system processor to process the increasing amount of data.

The system 100A may be upgraded to include ten door handles 150. Thus the system 100A functionality may expand to include automated security of certain doors of the building. The load and tasks of the primary system processor accordingly become increasingly memory intensive as well as increasingly computationally intensive. In system 100A, the primary system processor is implemented on one or more of the available premises management devices, such as, for example, the thermostats 120. In this situation though, even combined all of the thermostats 120 might not be able to support complete primary system processor functionality.

A continuum of primary system processor functionality therefore exists within system 100A. At one end is a constitution and configuration of devices providing full functionality, on the other end is a single device that can do little more than modify basic system functions in a limited manner. However, the system 100 is designed to progress toward full functionality and provide optimal results given the circumstances.

To achieve dynamic adjustment, the premises management devices 60 within the system 100 are configured to execute a primary function component related to managing a premises and a computational component to process system related tasks. The distinction between these two components may be viewed as a device-level primary function of the premises management device and a system-level function that the premises management device may perform completely on its own or in concert with other premises management devices When a premises management device 60 is introduced into the system 100, its capability of providing system-level work may be assessed. Based on the assessment, the device 60 may or may not be assigned to the primary system processor unit.

Figure 3:
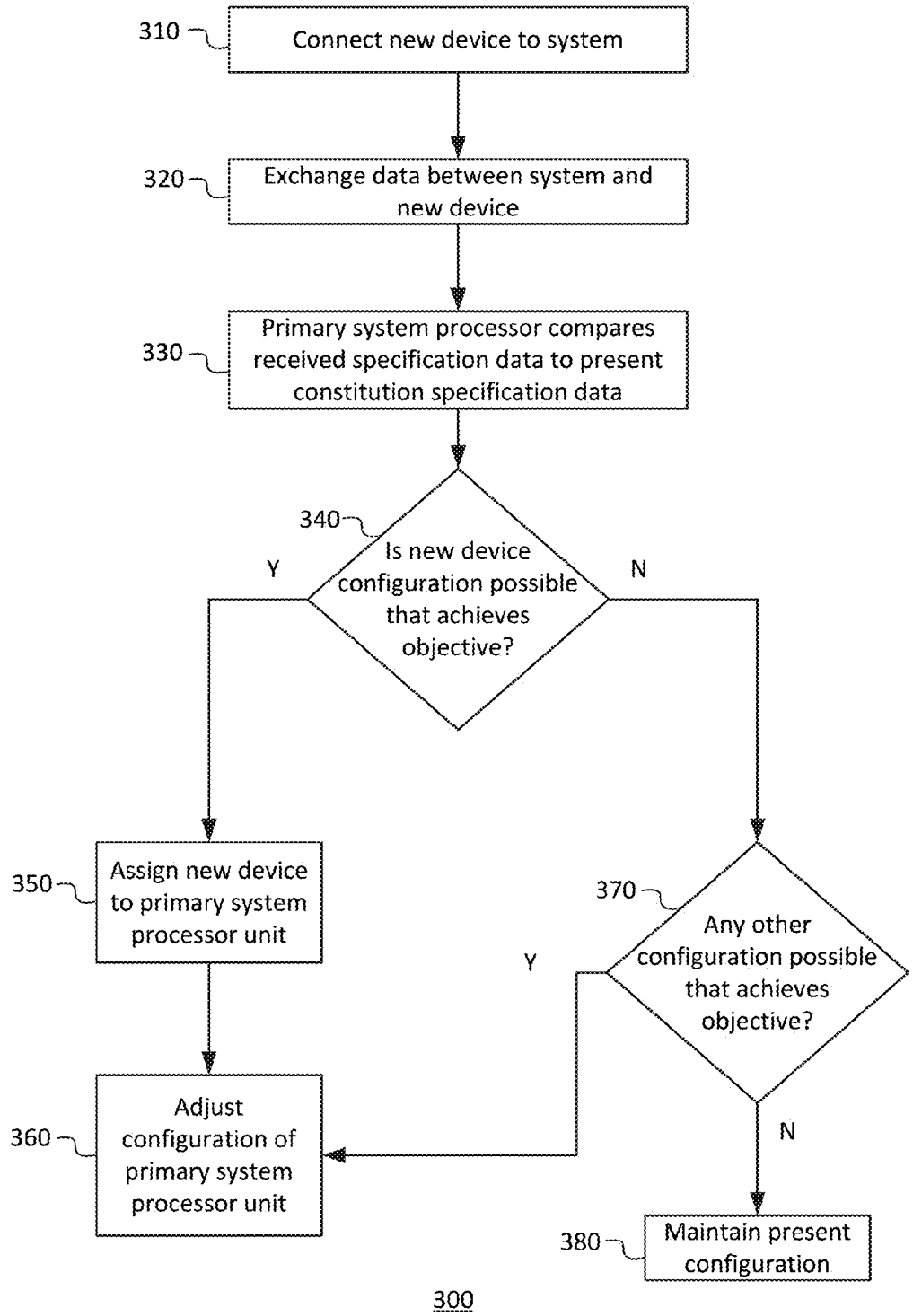
FIG. 3 shows a flowchart of integration of a premises management device according to an embodiment of the disclosed subject matter.

FIG. 3 shows a general flowchart of the integration of a premises management device into system 100 and the response of the primary system processor to this event. At operation 310 the new device enters into functional communication with the system 100. This may be established, for example, via a local area network such as WiFi, via a radio communication protocol such as Bluetooth®, via a near field communication protocol, or another type of wireless or wired data communication method.

At operation 320, the new premises management device submits specification and configuration data to the system 100 and receives data from the system. The primary system processor may control this exchange, which may include exchanging identification data as well as security checks to ensure that the new device is secure and compatible to operate as part of the system 100. Furthermore, the primary system processor may transmit data to the new device identifying the present devices that constitute the primary system processor, thereby notifying the new device of the present control system established in the system 100.

At operation 330 the primary system processor compares the received specification and configuration data to the specification and configuration data of the present configuration of devices that constitute the primary system processor. The primary system processor may determine, based on the received data, whether the new premises management device is qualified to implement the primary system processor in part or in full.

At operation 340 the primary system processor determines whether a new configuration of devices may be formed including the new device and advancing an operational objective of the primary system processor. Here, configuration may refer to a percentage allocation of the primary system processor per device, which is currently implementing the primary system processor. The basis for determining a new configuration may range from simple specification comparisons to complex algorithms taking into account one or more of a variety of factors, including, for example, respective levels of electrical power available, respective types of electrical power available, respective levels of computational power available, respective levels of network access, respective versions of operating system software, etc. The decision may further be directed toward one or more of a variety of operational objectives, which may change depending on the present or historical circumstances of the system 100. Such objectives may include, for example, increasing the speed/computational power of the primary system processor, decreasing the operational temperature of one or more of the devices presently implementing the primary system processor, increasing the memory of the primary system processor, minimizing an amount of data transmission within the system 100, increasing the efficiency of the primary system processor, performing a burst or flash operation of high intensity for a short duration of time, etc.

If a new configuration is possible which will achieve or advance a system objective in a manner determined to be superior to the present configuration's capabilities, the new device is assigned to the primary system processor unit at operation 350. The primary system processor unit adjusts the configuration and allocation of resources at operation 360 to form the next iteration of the primary system processor.

However, if at operation 340 the primary system processor determines that no foreseeable new configuration of devices including the new device will provide an iteration of a primary system processor which advances an operational objective or is otherwise superior to the present constitution and configuration, the primary system processor will forgo assigning the new device to the primary system processor unit.

Optionally, at operation 370 the primary system processor may consider whether any new configuration of the existing constitution is advantageous, for example, factoring in expanded functionality that the addition of the new device provides system 100 or the present condition of the premises and system 100. If the primary system processor determines that a new configuration is advantageous or achieves an operational objective, at operation 360 the primary system processor unit adjusts the configuration of the primary system processor unit. Otherwise, the primary system processor maintains its present configuration.

An example progression of the evolution of the primary system processor will now be provided. Referring back to FIG. 1, a user may have initially only installed thermostat 120. The system 100 is single device; therefore the primary system processor function may be carried out solely by the thermostat 120. The primary functions of the thermostat 120 could include, for example, HVAC control and, in some cases, a primitive form of security in which the thermostat 120 serves as a motion detector. In this single device embodiment, the primary system processor has a limited function, which could include, for example, communicating with a cloud-based server to run algorithms based on historical data or processing data to learn certain patterns or intricacies of the premises.

When the user later installs another premises management device 60, the new device is configured to automatically communicate with the system 100 under a common protocol and to exchange data. The new device may submit basic configuration and specification data to the primary system processor via the thermostat 120. Based on the data, the primary system processor evaluates the capabilities of the new device, compares them against the present capabilities of thermostat 120, and determines whether the new device should be assigned to the set of components presently implementing the primary system processor. The primary system processor may execute algorithms that consider and/or compare the various factors described above.

Accordingly, continuing the example regarding FIG. 1, when the user installs a 120V hazard detection unit 130, the primary system processor can exchange data and automatically self-adjust to change its constitution and distribute its implementation between the hazard detection unit 130 and the thermostat 120. For example, the primary system processor may evaluate factors such as the electrical power level of the hazard detection unit 130 and the potential of the hazard detection unit 130 to operate at higher operational temperatures than the thermostat 120 due to the hazard detection unit 130 being positioned away from users. Based on these factors, the primary system processor may conclude that the objective of performing at a faster speed may be achieved with the inclusion of the hazard detection unit 130. Accordingly, the primary system processor may assign both of the thermostat 120 and the hazard detection unit 130 to a common, collective group or unit that implements the primary system processor thereafter.

With the addition of the hazard detection unit 130, the primary system processor function can extend to a larger home safety system that includes hazard detection in conjunction with HVAC control, and a more advanced security system that might, for example, be self-arming by virtue of occupancy patterns detected in the different spaces in which the hazard detection unit 130 and the thermostat 120 are installed.

However, when the user later installs a plurality of battery-powered network-connected door handle units 150 for each of the exterior doors of the house, the devices that perform the primary system processor functionality may remain the same (i.e., the hazard detection unit 130 and the thermostat 120). Following the exchange of basic configuration and specification data, the primary system processor may evaluate the door handle units 150 as being relatively power-limited, passive devices that would not improve the operational capabilities of the primary system processor or further any presently defined objective.

Nevertheless, the functionality of the primary system processor may still expand, for example, to include automated control of a door handle 150 (e.g., the system 100 may automatically lock the front door when the primary system processor concludes that everyone in the family is home for the night). Therefore, the complexity of algorithms run by the primary system processor may increase due to the addition of the door handle 150.

An increase in system functionality or other change in circumstances may trigger a reevaluation of the present configuration of the primary system processor. In the example of FIG. 1, a greater percentage of the primary system processor implementation may be shifted to the hazard detection unit 130 since it is in direct network communication with the door handle 150.

Still further, if the user later installs a network-connected, battery-backed-up garage door opener (not shown), then the primary system processor functionality might be shifted primarily or completely over to the garage door opener, based on the availability of 120V AC power together with a high-capacity battery backup which would increase the robustness of the system 100.

As the above example demonstrates, the primary system processor may repeatedly adjust its constitution and/or configuration based on a variety of factors and to achieve a variety of objectives. Furthermore, the primary system processor functionality may be implemented across multiple premises management devices at the same time (e.g., the hazard detection unit 130 and the thermostat 120 together). The functionality may be distributed using any of a variety of different computing load-sharing techniques. For example, the total computational load may be handled on a percentage basis, e.g., each component of the primary system processor unit handles a percentage of the processing.

Various aspects of the primary system processor according to the present disclosure will now be described. Although the primary system processor constitution is described above as being adjusted upon the addition of new premises management devices, the primary system processor functionality may self-adjust dynamically upon other events, for example, timed interval system checks, removal of a device from the system 100, predefined events, sensor-triggered events, or other changes in the constitution or operation of the system 100.

In addition to the objectives already discussed, the primary system processor may adjust its constitution and/or configuration based on a self-preservation objective in response to situations inferred from data available about the environment. For example, if a hazard detector unit 130 detects a fire in one room of the premises 110, the primary system processor may adjust its constitution to be implemented by premises management devices on the opposite side of the premises, away from the fire. In another example, if a flood or water leak is detected in one or more rooms of the premises 110, the primary system processor may be adjusted to be implemented in devices which are on ceilings and/or upper floors of the premises 110. In yet another example, if an unauthorized intrusion is detected, e.g., a break-in is detected through a window, the primary system processor may be adjusted to be implemented in devices as far away from the intruder as possible as a measure against being destroyed by the intruder in a smash-and-bash attack.

Furthermore, the primary system processor may record data and "learn" the nature of the premises 110 and make adjustments to itself based on such data. For example, in the case of the hazard detection unit 130 and the thermostat 120 sharing the primary system processor functionality, it may be the case that the thermostat 120 is placed in a rarely-traveled end of a hallway and rarely detects any movement, while the hazard detection unit 130 is placed in a centrally located kitchen/family room area and is able to "see" much more action than the thermostat 120. Over the course of time, the system 100 may detect that a relatively large amount of wireless communications goes back and forth to the thermostat 120 responsive to sensor data from the hazard detection unit 130. Therefore, in such case, the primary system processor may determine that it may advantageously be implemented solely by the hazard detection unit 130, thereby reducing the overall volume of wireless communications on the home network.

Similarly, the system 100 may record data over time and "learn" that activity in the premises occurs in bursts in certain rooms according to the time of day. For example, on a Monday afternoon there may be little to no activity in a home. However, on Monday evening a large amount of activity may occur on the first floor as the residents arrive from work and school. In order to minimize latency in network communication, the primary system processor may adjust to be implemented in devices on the first floor. As evening shifts to night a majority of activity may shift to upper floors of the home. In response, the primary system processor may adjust to be implemented in devices on the upper floors. Likewise, the primary system processor may be reconfigured to accommodate increased processor demand caused by the increased level of activity in the home. In that case, system control tasks, data processing, algorithm execution and the like may be transferred from devices with low processor capacity to devices with higher processor capacity. Likewise, additional devices capable of contributing additional processor capacity to the system 100 overall may be added. That is, certain system control tasks may be assigned to devices in the system 100 that previously were not performing system control tasks.

Furthermore, the primary system processor may dynamically detect a level of network strength in each of the implementing devices and adjust itself accordingly. For example, a first device, which is part of the primary system processor implementing unit, may have a strong network connection. However, at a later time the network connection of the first device may decrease to a poor network connection. The primary system processor may adjust itself to remove the first device from the implementing unit and/or replace the first device with a second device that has a stronger network connection.

Although the system 100 is centralized on the primary system processor, it is possible for the system 100 to transition into a bifurcated or otherwise fragmented state. For example, one portion of the system 100 may lose communication with another portion. In this instance, each separate portion may form "islands" which each include their own primary system processor. Once communication has been reestablished, a single primary system processor may resume control of the system 100.

Generally, the primary system processor may operate similar to a rules engine. System-wide decisions are made by the primary system processor, which can therefore be considered as the central repository of authoritative information for the system. In other words, if authoritative system state information is needed by any component of the system 100 or by any external device in communication with the system 100, the primary system processor can be made to be the source of such information.

As discussed above, the primary system processor may access or receive data from sensors and user interaction and make decisions based upon the data. These decisions may be stored as "system state" variables. A system state is an authoritative state that is computed by the primary system processor that may be utilized by other devices of the system 100 or devices external to the system 100. For example, in a system 100 which includes a security system component, a "security state" may be a system state variable computed by the primary system processor and utilized by external servers or external devices.

Similar to the decisions of self-constitution and configuration, the primary system processor may create a "primary system storage unit" to store information, such as system state variables, which must or should be available system-wide. The primary system processor may store such information or historical sensor data in the same components which are presently implementing the primary system processor or generating the data, however, the present invention is not limited thereto. For example, passive devices that have memory components may be selected to implement the primary system storage unit, or external devices, such as external servers or cloud-based storage systems may be used. Factors, such as access to electrical power via direct line or battery, size of memory and network access, may be considered.

For example, data generated by an ambient light sensor in a room of a house and the time of day may be stored in the primary system storage unit comprised of the memory units of one or more hazard detection units, or an external, remote storage medium with the permission of the user. The primary system processor, in communication with the storage unit, may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the primary system processor may interpret the stored data as indicating that after 5:30 PM, an occupant is turning on/off a light as the occupant of the room in which the sensor is located enters/leaves the room. At other times, the light sensor data may indicate that no lights are turned on/off in the room. The primary system processor, therefore, may learn that occupant's patterns of turning on and off lights, and may generate a response to the learned behavior by using stored, historical sensor data.

Accordingly, at 5:30 PM, a smart home environment component of system 100 may automatically activate the lights in the room if it detects an occupant in proximity to the home. In some embodiments, the primary system processor may verify such behavior patterns using other sensors. Continuing the example, user behavior regarding specific lights may be verified and/or further refined based upon states of, or data gathered by, smart switches, outlets, lamps, and the like.

Figure 5:
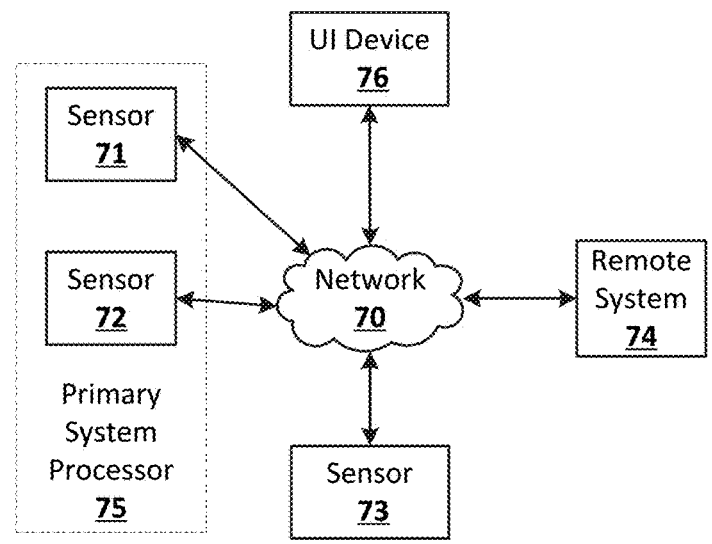
FIG. 5 shows a system according to an embodiment of the disclosed subject matter.

FIG. 5 shows an example of a premises management system as disclosed herein, which may be implemented over any suitable wired and/or wireless communication networks. One or more premises management devices (sensors) 71, 72, 73 may communicate via a local network 70, such as a WiFi or other suitable network, with each other. A user may interact with the premises management system, for example, using a UI device 76 that communicates with the system via network 70. One or more of the sensors 71, 72, 73 may be configured to implement a primary system processor 75. The primary system processor 75 may, for example, receive, aggregate, and/or analyze environmental information received from the sensors 71, 72, 73 and the UI device 76. The sensors 71, 72, 73 may be located locally to one another, such as within a single dwelling, office space, building, room, or the like, or they may be remote from each other, such as where a portion or percentage of the primary system processor 75 is implemented in a remote system 74 such as a cloud-based reporting and/or analysis system. Remote system 74 may provide cloud-based computing services that provide more powerful processing than may be available within the local components of the primary system processor. Alternatively or in addition, sensors may communicate directly with a remote system 74. The remote system 74 may, for example, aggregate data from multiple locations, provide instruction, software updates, and/or aggregated data to the primary system processor 75 and/or sensors 71, 72, 73.

A ratio of computation between local components and remote system 74 may be dynamically controlled by the primary system processor. Depending on present tasks and objectives of the system 100, in some instances it may be more efficient to process data locally. For example, local processing may be preferred in situations in which a fast response is critical, e.g., determining whether the data indicates an alarm should be sounded, in situations in which security requirements of data are heightened, e.g., regarding data that a user would prefer not to be transmitted beyond the premises due to concern of interception, and in situations in which a degradation of the data due to transmission is sufficiently detrimental to an objective, e.g., when compressing and decompressing image, video, or sound data for transmission causes loss which renders the use of the data less accurate.

Alternatively, in other instances it may be more efficient to process data remotely. Situations that require large data storage or complicated computations with complex algorithms beyond the capabilities of the local components or which would require an unacceptable amount of time and/or resources from the local components may be processed remotely. The primary system processor may therefore dynamically consider various factors to determine a ratio of remote/local processing or a designation of tasks that should be handled locally or remotely.

The premises management system shown in FIG. 5 may be an example of a smart-home environment. The depicted smart-home environment may include a structure, a house, office building, garage, mobile home, or the like. The devices of the smart home environment, such as the sensors 71, 72, 73, and the network 70 may be integrated into a smart-home environment that does not include an entire structure, such as an apartment, condominium, or office space.

The smart home environment can control and/or be coupled to devices outside of the structure. For example, one or more of the sensors 71, 72, 73, may be located outside the structure, for example, at one or more distances from the structure (e.g., sensors 71, 72, may be disposed outside the structure, at points along a land perimeter on which the structure is located, and the like). Likewise, the primary system processor 75 that may receive data from the sensors 71, 72, 73, may be implemented in sensors located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, 73, may be mounted on, integrated with and/or supported by a wall, floor, or ceiling of the structure.

The smart-home environment including the premises management system shown in FIG. 5 may include a plurality of premises management devices as described herein, including, for example, intelligent, multi-sensing, network-connected devices, that can integrate seamlessly with each other and/or with a central controller or a cloud-computing system (e.g., primary system processor 75 and/or remote system 74) to provide home-security and smart-home features. The smart-home environment may include, for example, one or more intelligent, multi-sensing, network-connected thermostats (e.g., "smart thermostats"), one or more intelligent, network-connected, multi-sensing hazard detection units (e.g., "smart hazard detectors"), one or more intelligent, multi-sensing, network-connected entryway interface devices (e.g., "smart doorbells"), and one or more passive sensors. The smart hazard detectors, smart thermostats, smart doorbells, and passive sensors may be the sensors 71, 72, 73 shown in FIG. 5.

For example, a smart thermostat (e.g., thermostat 120 depicted in FIG. 1) may detect ambient climate characteristics (e.g., temperature and/or humidity) and may control an HVAC (heating, ventilating, and air conditioning) system accordingly of the structure. For example, the ambient climate characteristics may be detected by sensors 71, 72, 73 shown in FIG. 5, and the primary system processor 75 may control the HVAC system (not shown) of the structure.

As another example, a smart hazard detector (e.g., hazard detector 130 depicted in FIG. 1) may detect the presence of a hazardous substance or a substance indicative of a hazardous substance (e.g., smoke, fire, or carbon monoxide). For example, smoke, fire, and/or carbon monoxide may be detected by sensor 71 shown in FIG. 5, and the primary system processor 75 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display controlled by, for example, the primary system processor 75.

In some embodiments, the smart-home environment of the premises management system shown in FIG. 5 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72, 73, shown in FIG. 5. A smart wall switch may detect ambient lighting conditions, and control a power and/or dim state of one or more lights. For example, a sensor such as sensors 71, 72, 73, may detect ambient lighting conditions, and a device such as the primary system processor 75 may control the power to one or more lights (not shown) in the smart-home environment. Smart wall switches may also control a power state or speed of a fan, such as a ceiling fan. For example, sensors 71, 72, 73, may detect the power and/or speed of a fan, and the primary system processor 75 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72, 73, shown in FIG. 5. The smart entry detectors (e.g., entry detectors 140 depicted in FIG. 1) may be disposed at one or more windows, doors, and other entry points of the smart-home environment for detecting when a window, door, or other entry point is opened, broken, breached, and/or compromised. The smart entry detectors may generate a corresponding signal to be provided to the primary system processor 75 and/or the remote system 74 when a window or door is opened, closed, breached, and/or compromised. In some embodiments of the disclosed subject matter, the alarm system, which may be controlled by the primary system processor 75 and/or coupled to the network 70 may not arm unless all smart entry detectors (e.g., sensors 71, 72, 73) indicate that all doors, windows, entryways, and the like are closed and/or that all smart entry detectors are armed.

The smart-home environment of the sensor network shown in FIG. 5 can include one or more intelligent, multi-sensing, network-connected door handles (e.g., "smart door handles"). For example, the sensors 71, 72, 73, may be coupled to a door handle of a door (e.g., door handle 150 depicted in FIG. 1). However, it should be appreciated that smart door handles can be provided on external and/or internal doors of the smart-home environment.

The smart thermostats, the smart hazard detectors, the smart doorbells, the smart wall switches, the smart wall plugs, the smart entry detectors, the smart door handles, passive sensors and other devices of a smart-home environment (e.g., as illustrated as sensors 71, 72, 73, of FIG. 5) can be communicatively coupled to each other via the network 70, and to the primary system processor 75 and/or remote system 74 to manage the premises and provide security, safety, and/or comfort for the smart home environment.

A user can interact with one or more of the network-connected smart devices (e.g., via the network 70). For example, a user can communicate with one or more of the network-connected smart devices using the UI device 76, a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home.

One or more users can control or access data from one or more of the network-connected smart devices in the smart-home environment using a network-connected computer or portable electronic device. In some examples, some or all of the users (e.g., individuals who live in the home) can register their mobile device and/or key FOBs with the smart-home environment. Such registration can be made via user interface 76, via an interface provided on one of the sensors 71, 72, 73, or via a computer in communication with one of the sensors 71, 72, 73, or at a central server (e.g., the remote system 74). Registration may be used to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central processor or cloud-computing system (e.g., primary system processor 75 and/or remote system 74) regarding detected movement and/or presence of people, animals, and any other objects and receives back commands for controlling the lighting accordingly.

The primary system processor 75 and/or remote system 74 can control the outdoor lighting system based on information received from the other network-connected smart devices in the smart-home environment and/or the UI device 76. For example, in the event that any of the network-connected smart devices, such as smart wall plugs located outdoors, detect movement at night time, the primary system processor 75 and/or remote system 74 can activate the outdoor lighting system and/or other lights in the smart-home environment.

Figure 6:
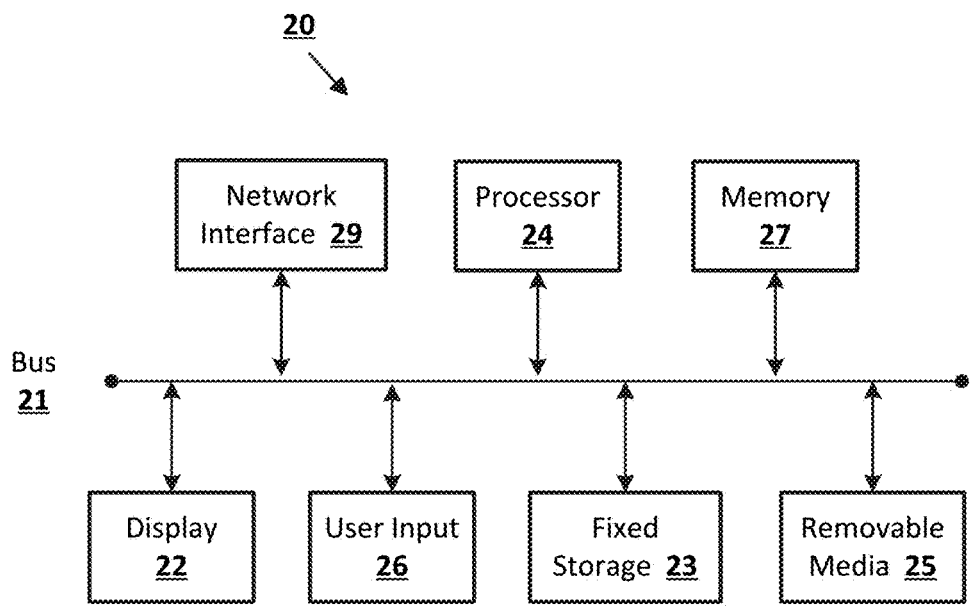
FIG. 6 shows a computing device according to an embodiment of the disclosed subject matter.

Embodiments of the presently disclosed subject matter may be implemented in and used with a variety of computing devices. FIG. 6 is an example computing device 20 suitable for implementing embodiments of the presently disclosed subject matter. For example, the device 20 may be used to implement the UI device 76, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A premises management system, comprising:
a plurality of inter-connected premises management devices, each premises management device including a storage device, a memory that stores computer executable components, and a processor that executes the following computer executable components stored in the memory:
a primary function component to control a primary function of the premises management device related to managing a premises;
a communication component to communicate with other compatible premises management devices; and
a computational component to process system related tasks,
wherein each premises management device is configured to function as part of a unit comprising one or more devices that collectively form a primary system processor when the present primary system processor assigns the respective premises management device to the unit, and wherein the primary system processor processes system level tasks, assigns premises management devices to the unit and removes premises management devices from the unit based on resources presently available to each of the premises management devices.

2. The system of claim 1, wherein the primary system processor automatically determines whether to adjust the configuration of the unit when a new premises management device establishes functional communication with the system.

3. The system of claim 1, wherein the primary system processor further assigns premises management devices to the unit and removes premises management devices from the unit in order to move a physical implementation of the primary system processor away from a hazardous situation.

4. The system of claim 1, wherein the resources include amount of electrical power, type of electrical power, amount of computational power, and amount of network access.

5. The system of claim 1, wherein the primary system processor further assigns and removes premises management devices to and from the unit in order to decrease an operational temperature of one or more of the premises management devices.

6. The system of claim 1, wherein the primary system processor further assigns and removes premises management devices to and from the unit in order to minimize an amount of data transmission within the system.

7. The system of claim 1, wherein the primary system processor is implemented at least in part by one or more processors in an external system in communication with the premises management system via a network.

8. The system of claim 1, wherein the plurality of premises management devices includes:
   a plurality of smart devices, one or more of which are part of the unit that implements the primary system processor; and
   a plurality of passive devices that are controlled by the primary system processor.

9. The system of claim 8, wherein the plurality of smart devices includes a thermostat device to control an HVAC system of the premises.

10. The system of claim 8, wherein the plurality of smart devices includes a garage door opener to control a garage door of the premises.

11. The system of claim 8, wherein the plurality of smart devices includes a hazard detection unit to detect hazardous situations in an environment of the premises.

12. The system of claim 8, wherein the plurality of passive devices includes a door handle to control a locking function of a door of the premises.

13. The system of claim 8, wherein the plurality of passive devices includes an entry detection unit to detect a subject's entry or exit of the premises.

14. The system of claim 8, wherein the primary system processor assigns smart devices from among the plurality of smart devices to the primary system processor unit and assigns passive devices from among the plurality of passive devices to a function as a primary system storage unit to store historical data.

15. The system of claim 8, wherein the primary system processor selects smart devices which have a relatively greater amount of electrical power available for powering the computational component to be a part of the primary system processor unit and removes smart devices which have a relatively lesser amount of electrical power available for powering the computational component from being a part of the primary system processor unit.

16. The system of claim 1, wherein the inter-connected premises management devices include a thermostat, a plurality of sensors, a door handle, and a hazard detection unit, and wherein the primary system processor controls the plurality of inter-connected premises management devices to control security of the premises, to control environmental temperature of the premises, and to monitor the premises for hazardous situations.

17. The system of claim 16, wherein the primary system processor stores historical data obtained by the plurality of sensors, and wherein the primary system processor manages the system at least in part according to the stored historical data.

18. The system of claim 16, wherein the primary system processor uses data obtained from a first one of the plurality of inter-connected premises management devices to control a second one of the plurality of inter-connected premises management devices.

19. A method of operating a premises management system including a plurality of inter-connected premises management devices, each having a primary function related to management of a premises and each including a storage device, a memory that stores computer executable components, and a processor that executes computer executable components stored in the memory, the method comprising:
   assigning one or more of the plurality of premises management devices to a unit that functions as a primary system processor to process system-level tasks for the premises management system;
   establishing a connection between the plurality of premises management devices and a first premises management device which, prior to the connection, was not one of the plurality of premises management devices; and
   assigning the first premises management device to the unit that functions as the primary system processor when the primary system processor determines that the assignment advances an operational objective of the primary system processor.

20. The method of claim 19, further comprising removing one or more of the plurality of premises management devices from the unit that functions as the primary system processor when the primary system processor determines that removal of the one or more of the plurality of premises management device advances an operational objective of the primary system processor.

21. The method of claim 19, wherein the primary system processor determining that the assignment advances an operational objective of the primary system processor comprises:
   comparing resources available to the first premises management device against presently available system resources, the resources including amount of electrical power, type of electrical power, amount of computational power and amount of network access; and
   calculating a net impact on an operational speed of the primary system processor.

22. The method of claim 19, wherein the primary system processor determining that the assignment advances an operational objective of the primary system processor further comprises:
   calculating a net impact on operational temperature of one or more of the devices that comprise the primary system processor.

23. The method of claim 19, wherein the plurality of premises management devices includes a plurality of smart devices, one or more of which form the primary system processor unit, and a plurality of passive devices which are controlled by the primary system processor unit, the method further comprising:
- dynamically assigning smart devices from among the plurality of smart devices to the primary system processor unit when the primary system processor determines that the assignment advances an operational objective of the primary system processor; and
- dynamically assigning passive devices from among the plurality of passive devices to a function as a primary system storage unit to store historical data when the primary system processor determines that the assignment advances an operational objective of the primary system processor.

24. The method of claim 23, further comprising:
- assigning smart devices which have a relatively greater amount of electrical power available to be a part of the primary system processor unit; and
- removing smart devices which have a relatively lesser amount of electrical power available from being a part of the primary system processor unit.

* * * * *